United States Patent
Shively (10) Patent No.: US 11,851,207 B2
(45) Date of Patent: Dec. 26, 2023

(54) PLATE AIR AND LIGHT BEZEL

(71) Applicant: Textron Aviation Inc., Wichita, KS (US)

(72) Inventor: John Harrison Shively, Maize, KS (US)

(73) Assignee: Textron Aviation Inc., Wichita, KS (US)

( * ) Notice: Subject to any disclaimer, the term of this patent is extended or adjusted under 35 U.S.C. 154(b) by 0 days.

(21) Appl. No.: 18/194,769

(22) Filed: Apr. 3, 2023

(65) Prior Publication Data
US 2023/0322405 A1 Oct. 12, 2023

Related U.S. Application Data

(60) Provisional application No. 63/329,038, filed on Apr. 8, 2022.

(51) Int. Cl.
*B64D 47/02* (2006.01)
*B64D 11/00* (2006.01)
*B64D 13/00* (2006.01)
*B60Q 3/54* (2017.01)

(52) U.S. Cl.
CPC .............. *B64D 47/02* (2013.01); *B64D 11/00* (2013.01); *B64D 13/00* (2013.01); *B60Q 3/54* (2017.02); *B64D 2011/0053* (2013.01); *B64D 2013/003* (2013.01)

(58) Field of Classification Search
CPC ...... B64D 2011/0053; B64D 2013/003; B60Q 3/54
See application file for complete search history.

(56) References Cited

U.S. PATENT DOCUMENTS

| | | | |
|---|---|---|---|
| 5,328,152 A * | 7/1994 | Castle | B60H 1/3442 74/25 |
| 6,595,656 B2 | 7/2003 | Yoda | |
| 7,434,962 B2 | 10/2008 | Stache | |
| 10,272,834 B2 | 4/2019 | Riedel | |
| 11,167,690 B2 | 11/2021 | Blacken et al. | |
| 2011/0157906 A1* | 6/2011 | Oeuvrard | B60R 13/02 362/488 |
| 2016/0222654 A1* | 8/2016 | Shimizu | B64C 1/066 |
| 2017/0368990 A1* | 12/2017 | Blacken | B60Q 3/44 |
| 2020/0101894 A1* | 4/2020 | Hibino | B60Q 3/76 |
| 2020/0207183 A1* | 7/2020 | Grant | B60Q 3/47 |

FOREIGN PATENT DOCUMENTS

EP 3461667 A1 * 4/2019 ........... B60H 1/3414

* cited by examiner

*Primary Examiner* — Alexander K Garlen
(74) *Attorney, Agent, or Firm* — Avek IP, LLC (57) ABSTRACT

A fixture configured to secure a component in a vehicle includes a panel separating an internal cabin from an external compartment. The panel has a first side facing the internal cabin and a second side facing the external compartment. A hole is disposed within the panel. The component is configured for mounting to the panel via the hole. The component includes a flange configured for abutting the first side of the panel and a coupling feature configured to extend through the hole into the external compartment. A fastener is configured to removably couple with the coupling feature and abut the second side of the panel for fastening the component to the panel.

15 Claims, 9 Drawing Sheets

PLATE AIR AND LIGHT BEZEL

CROSS-REFERENCE TO RELATED APPLICATIONS

This application claims the benefit of priority of U.S. Provisional Patent Application No. 63/329,038, entitled Plate Air and Light Bezel and filed on Apr. 8, 2022, the disclosure of which is herein incorporated by reference in its entirety.

1. FIELD

Embodiments of the invention relate generally to aircraft passenger service units, and more specifically to bezel plates for passenger air and lighting systems.

2. RELATED ART

Many different passenger air and lighting systems are known. For example, U.S. Pat. No. 7,434,962 to Stache discloses a lighting assembly in an overhead console that includes a bezel. U.S. Pat. No. 11,167,690 to Blacken et al. discloses an adaptor assembly secured to a light source, where the adaptor assembly includes a bezel. U.S. Pat. No. 6,595,656 to Yoda discloses a lamp housing located within a panel, where the lamp housing includes an annular bezel attached to it. U.S. Pat. No. 10,272,834 to Riedel discloses a reading light assembly that includes a lamp housing which houses a light source, and that the light source can be rotated using a spacer ring.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, a fixture configured to secure a component in a vehicle includes: a panel separating an internal cabin from an external compartment, wherein the panel has a first side facing the internal cabin and a second side facing the external compartment; a hole disposed within the panel; the component is configured for mounting to the panel via the hole, wherein the component includes: a flange configured for abutting the first side of the panel; and a coupling feature configured to extend through the hole into the external compartment; and a fastener configured to removably couple with the coupling feature and abut the second side of the panel for fastening the component to the panel.

In another embodiment, a fixture configured to secure at least two components in a vehicle includes: a panel dividing an internal cabin from an external compartment, wherein the panel has a first side facing the internal cabin and a second side facing the external compartment; a first hole disposed within the panel, and a second hole disposed within the panel adjacent the first hole; a first component configured for mounting to the panel through the first hole; a second component configured for mounting to the panel through the second hole, wherein the first component and the second component each include: a flange configured for remaining on the first side of the panel; and a coupling feature configured to extend into the external compartment; a first fastener configured to removably couple to the coupling feature of the first component and abut the second side of the panel for fastening the first component to the panel; and a second fastener configured to removably couple to coupling feature of the second component and abut the second side of the panel for fastening the second component to the panel.

In yet another embodiment, an assembly method for a fixture configured to secure a component in a vehicle includes: inserting an external portion of the component through a hole in a bezel plate, wherein the component includes a flange configured to abut against the bezel plate around the hole; inserting the external portion of the component through a matching hole in a panel such that the matching hole is in alignment with the hole in the bezel plate, wherein the panel separates an internal cabin from an external compartment; and coupling the component to a fastener in the external compartment such that the bezel plate and the panel are sandwiched between the flange and the fastener for securing the component to the panel.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Various vehicles include an internal cabin that houses numerous passenger seats. The passenger seats may be arranged in rows and/or columns within the internal cabin. For example, an airplane may include rows and columns of seats with one or more aisles extending through the rows. Numerous lights and/or air vents are provided for the passengers within the internal cabin, and typically provided per each passenger.

These lights and air vents must be integrated into the internal cabin of the vehicle in a manner as to decrease the amount of space taken up both inside the internal cabin, as well as in the external compartment just outside the internal cabin. Additionally, the fixtures maintaining the lights and/or air vents must be secured so as to not become dislodged during travel of the vehicle. Another required aspect of these fixtures is that they maintain a relative ease of access to the lights/air vents such that maintenance may be performed on either. A need exists for a cost-effective, adaptable system, and assembly to provide lighting and/or vent fixtures within an internal cabin. Certain embodiments of the present disclosure provide an adaptable system and assembly for affixing lighting and/or ventilation to the internal cabin of a vehicle, such as an aircraft.

Figure 1:
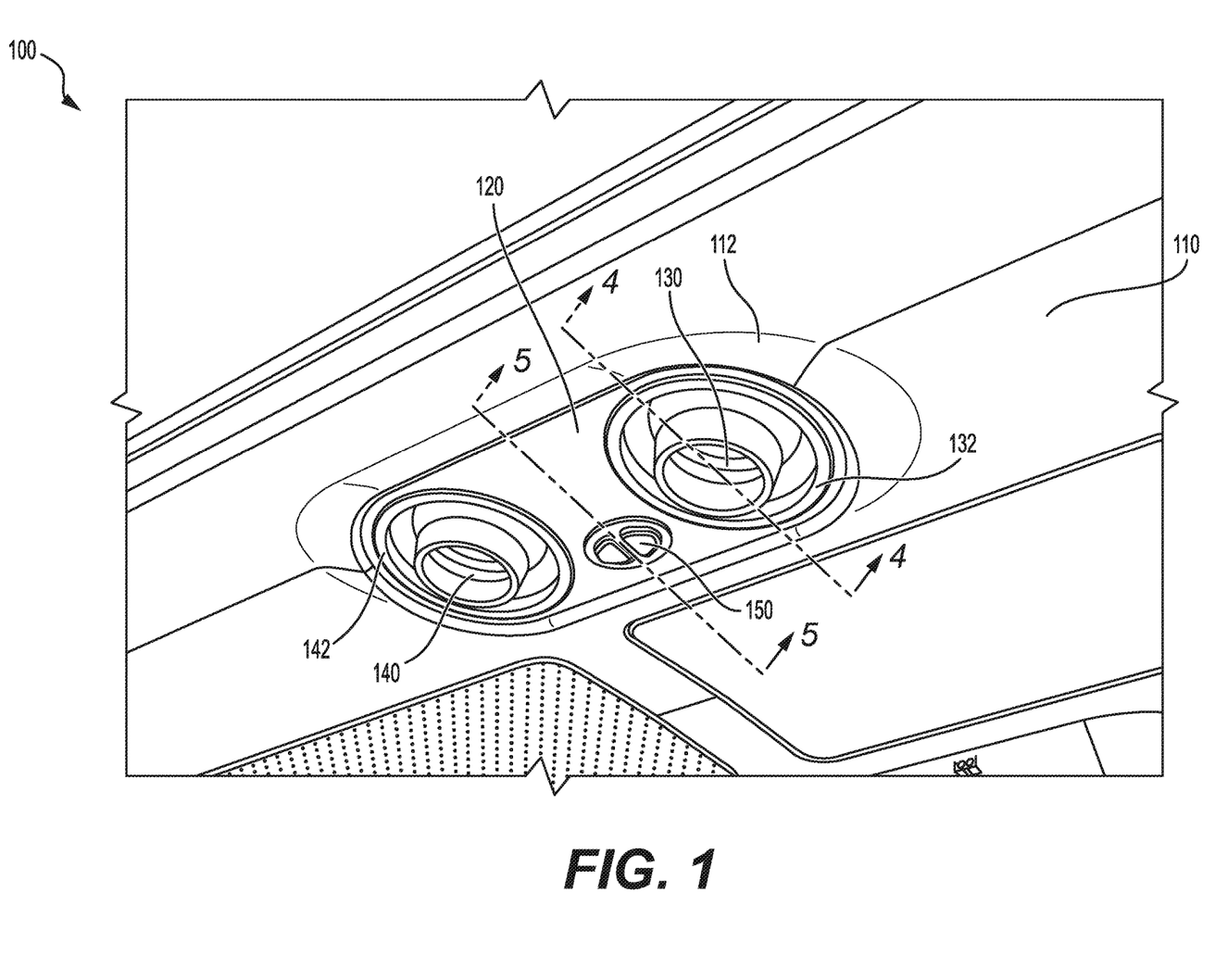
FIG. 1 is a perspective view of a fixture from inside an internal cabin, in some embodiments.

FIG. 1 illustrates a perspective view of some embodiments of a fixture 100 of an internal cabin. The fixture 100 is provided within a panel 110. Panel 110 is typically located within the internal cabin, such that an internal side is directed towards the internal cabin and may be viewable by passengers within the cabin. Additionally, panels (e.g., panel 110) include an external surface that is not viewable by the passengers within the aircraft. As such, the panel 110 may provide a divide between the internal cabin (e.g., internal cabin 102 in FIG. 2) and the external compartment (e.g., external compartment 104 in FIG. 2).

Typically, as described above, panel 110 provides a physical separation between the internal cabin 102 and the external compartment 104, and certain components of the vehicle may be affixed to the panel 110. For example, lights, air vents, speakers, buttons, controls, warnings, signs, indicia, markings, etc. may be affixed or otherwise fastened to the panel 110. In some vehicles, such as aircraft, buses, trains, cars, etc., the fixtures maintaining the components within panel 110 must be sufficiently secured such that the components do not move during use of the vehicle. Accordingly, fixture 100 is configured to maintain one or more components within panel 110 prior to, during, and following use of the vehicle in which panel 110 is included.

Figure 2:
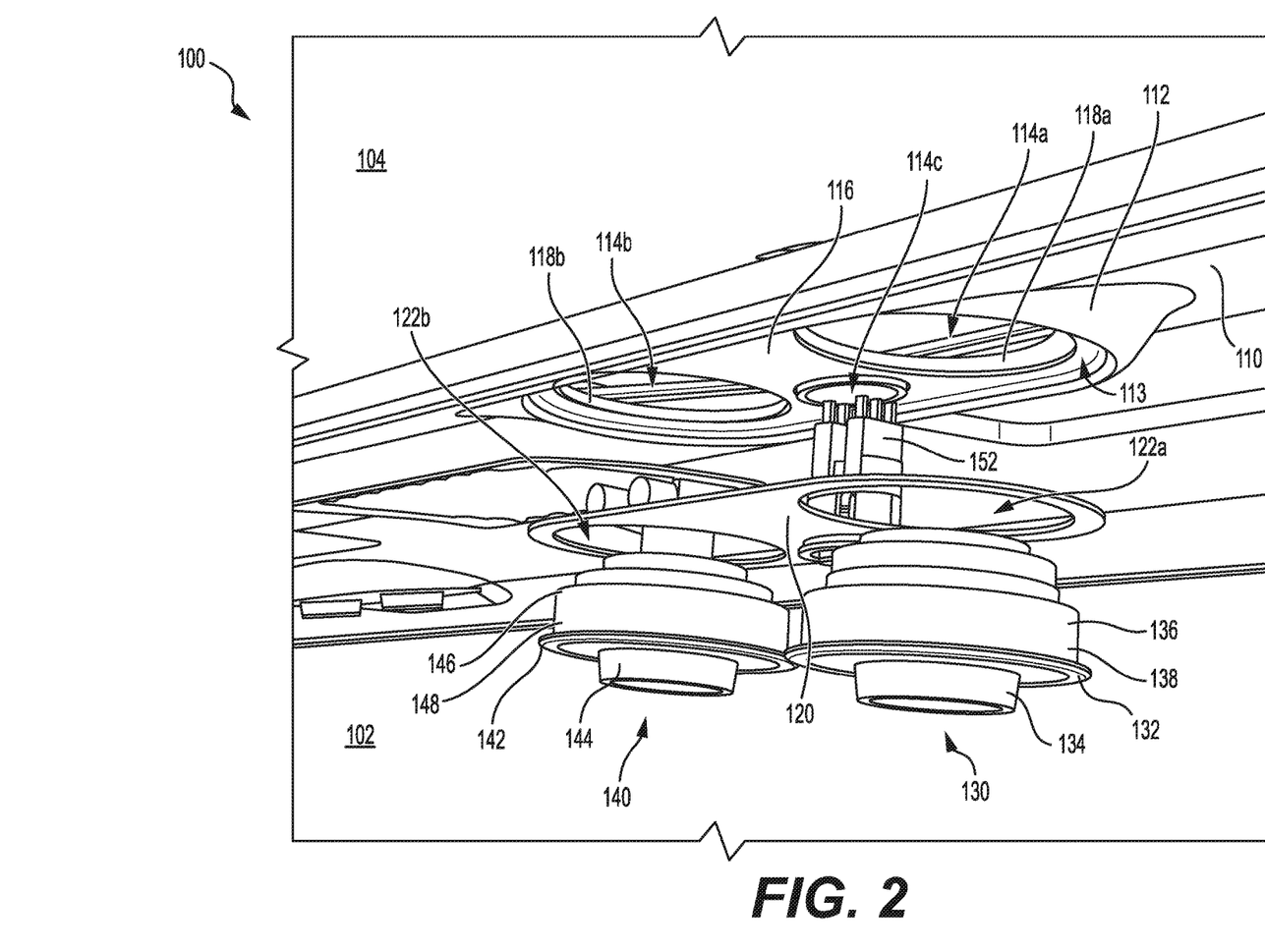
FIG. 2 is an exploded perspective view of the fixture of FIG. 1, in some embodiments.
Figure 3:
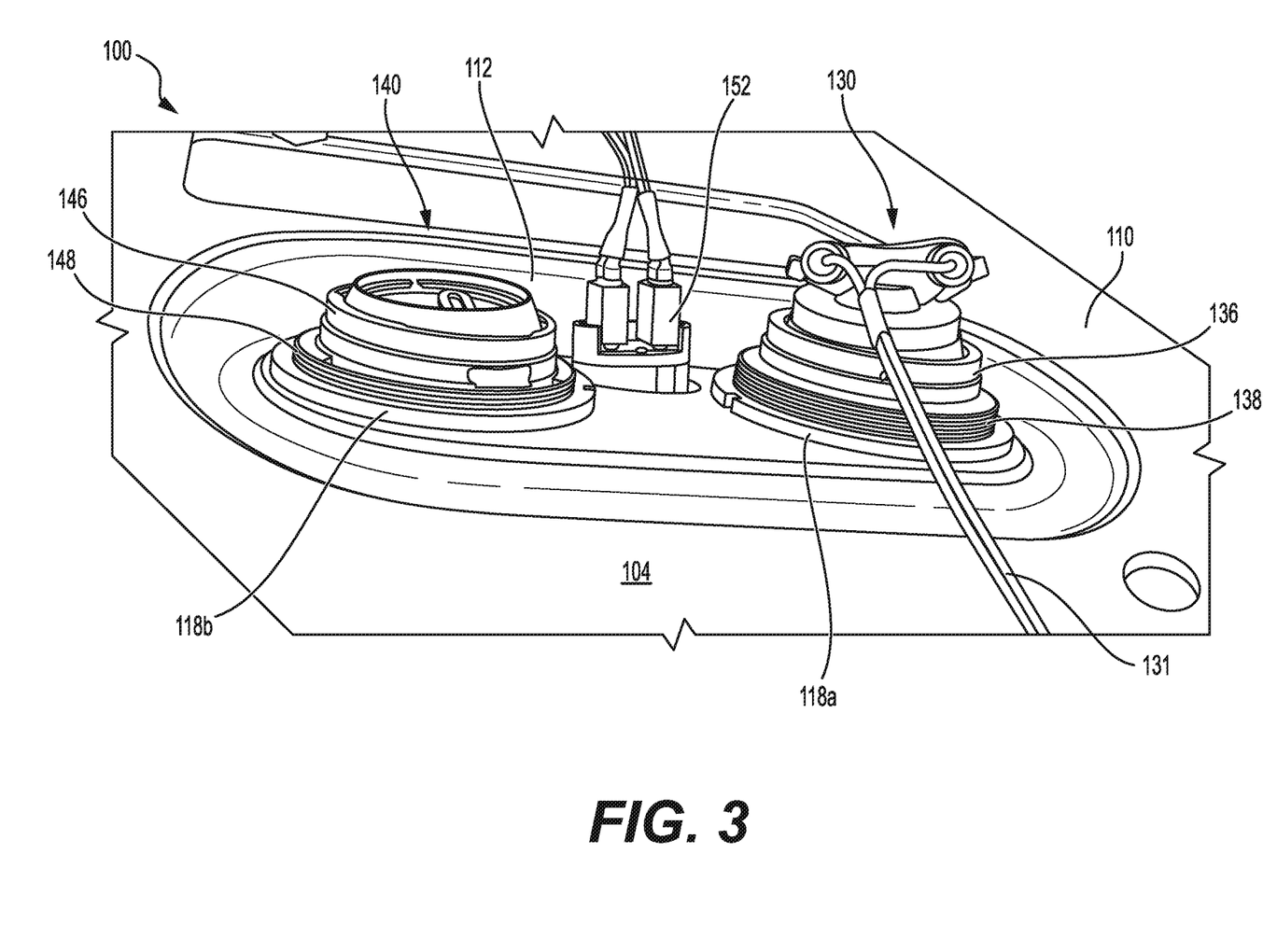
FIG. 3 is a perspective of the fixture of FIG. 1 from an external compartment, in some embodiments.
Figure 4:
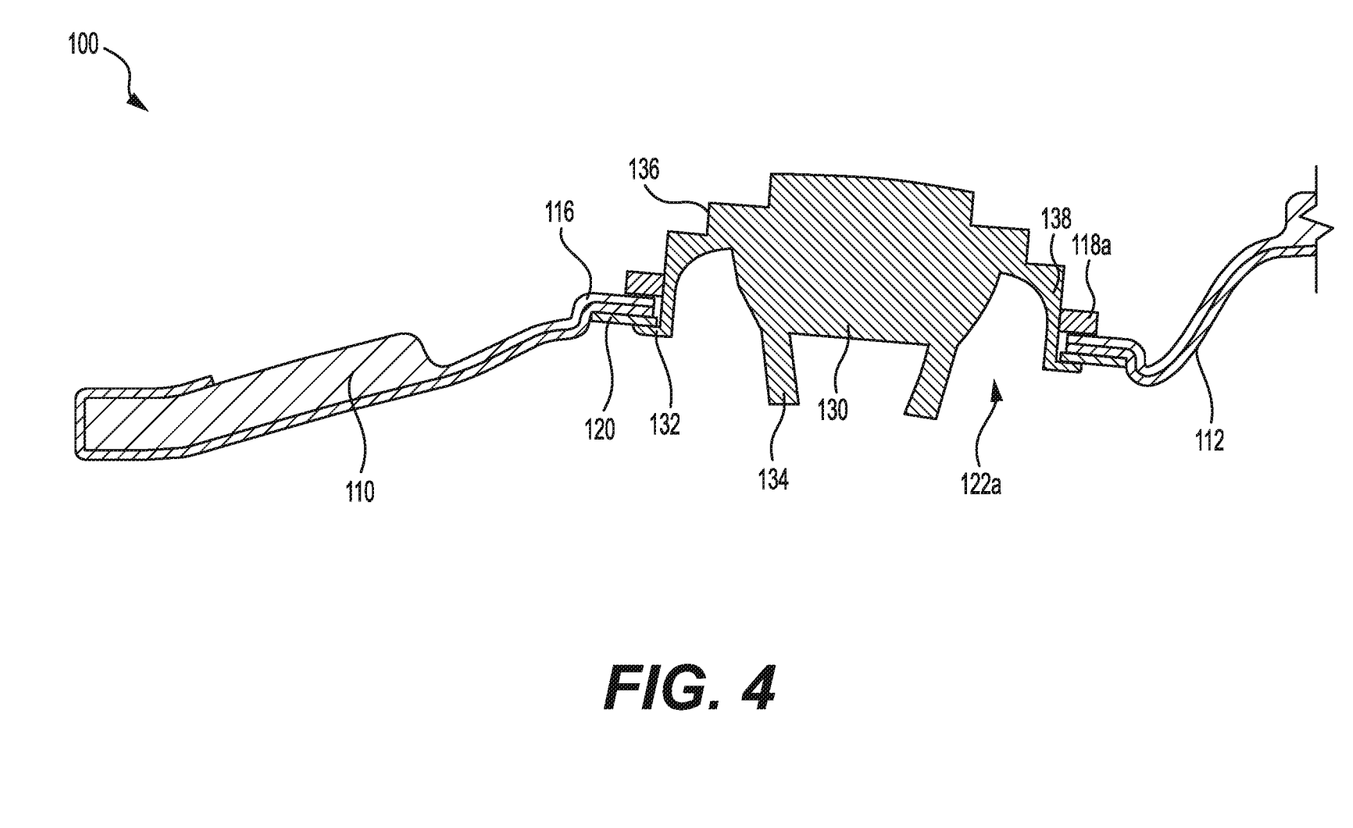
FIG. 4 is a cross sectional side view of the fixture of FIG. 1, in some embodiments.

In some embodiments, panel 110 includes a housing 112 which may receive some or all of the a component such as a light 130 or a vent 140 as depicted in FIG. 1. As illustrated in FIGS. 1-4, housing 112 may be an extension from the internal side of the panel 110 into the internal cabin 102. In some embodiments, the housing 112 may be a recession from the internal side of the panel 110 into the external compartment 104. Housing 112 may be configured to direct one or more of a light source or a vent towards one or more passengers located within the internal cabin 102. For example, in some embodiments panel 110 is a panel defining an interior cabin wall of an aircraft. In this example, panel 110 may be substantially rounded throughout. Accordingly, the housing 112 may define a substantially flat surface by which to affix a light, a vent, and/or a switch. Such a flat surface allows for the direction of the light and/or air to be directed at the passenger. In these embodiments, the shape of housing 112 may not be uniform. For example, one side of housing 112 may extend further into the internal cabin 102 than the other side. For example, as illustrated in FIGS. 2-4, housing 112 is configured to form a recessed flat surface 116 that forms a substantially flat surface by which to affix a component (e.g., light 130 or vent 140). It is further contemplated that fixture 100 may be included in a panel 110 of a vehicle that is substantially horizontal in relation to the passengers of the vehicle; additionally, it is contemplated that panel 110 may be substantially flat (i.e., not curved); however, housing 112 may still be configured with recessed flat surface 116 for aiming the affixed components (e.g., to point in a direction that differs slightly from a direction normal to the substantially flat panel).

FIG. 2 is an exploded perspective view of fixture 100 with parts separated from their installed locations for clarity of illustration. In some embodiments, in addition to housing 112 providing recessed flat surface 116, fixture 100 includes a bezel plate 120. As illustrated in FIG. 1, bezel plate 120 may additionally provide a flat surface that, when assembled, allows the surfaces of light 130, vent 140, and/or a user interface 150 to be substantially on the same plane as the bezel plate 120. Further, bezel plate 120 may completely fill any surfaces within housing 112 that would otherwise be visible, such that bezel plate 120 and panel 110 are substantially congruous when fixture 100 is assembled. This will be discussed in greater detail below with reference to FIGS. 2-4.

In some embodiments, one or more of the light 130 and/or the vent 140 may include a flange 132, 142, respectively. The flange 132/142 may be configured to abut the bezel plate 120 around the outer circumference of first and second holes 122a, 122b, respectively, when fixture 100 is assembled. For example, as illustrated in FIG. 2, bezel plate 120 may include a first hole 122a and a second hole 122b. First and second holes 122a, 122b may be configured to receive some portions of light 130 and/or vent 140. For clarity, the following description will be directed to the light 130 and its associated features. However, it is to be understood that the description may similarly be applied to vent 140 and its associated features. In some embodiments, flange 132 may extend concentrically outward from light 130 such that the flange 132 will not fit through hole 122a. For example, the diameter of flange 132 is greater than the diameter of the hole 122a. As such, an external portion 136 of light 130 will extend into the external compartment 104 while an internal portion 134 of light 130 will extend into and/or be viewable from internal cabin 102. Accordingly, flange 132 may maintain the placement of bezel plate 120 when fixture 100 is assembled.

With continuing reference to FIG. 2, the housing 112 may include a recess 113 configured to receive the bezel plate 120. Recess 113 may be a region within panel 110 that extends into the external compartment 104. In some embodiments, recess 113 may have a depth (i.e., extend into external compartment 104) that is substantially the depth of the bezel plate 120. For example, as described above, when fixture 100 is assembled, the surface of the bezel plate 120 and the panel 110 may be substantially congruous. This is due to the depth of recess 113 being substantially the same as the depth of the bezel plate 120.

In some embodiments, panel 110 may include holes 114a, 114b, and/or 114c formed in recessed flat surface 116. Holes 114a, 114b, and 114c may be configured to receive some portions of light 130, vent 140, and user interface 150, respectively. Additionally, a fastener 118a/118b may be affixed to holes 114a/114b, respectively. As illustrated, the fastener 118a/118b may be affixed to the external side of the hole 114a/114b. In some embodiments, the fastener 118a/118b may be an extension of the panel 110 into the external compartment. It is further contemplated that fastener 118a/118b may be incorporated or affixed within hole 114a/114b or on the internal surface of hole 114a/114b. As will be discussed in greater detail below, fastener 118a/118b may allow for temporary attachment of the light 130 and/or vent 140 to the panel 110. In some embodiments, a depth, width, and length of recess 113 is defined by the shape of housing 112 and panel 110. Recess 113 is configured to receive bezel plate 120, and recessed flat surface 116 is configured to provide a surface against which bezel plate 120 abuts when fixture 100 is assembled.

The extension of external portion 136/146 into the external compartment 104 may provide for electrical connection or power supply such that these connections may not be viewable to a passenger in the internal cabin 102. Further, user interface 150 may include a plug 152 (see FIGS. 3 and 5) that similarly extends into the external compartment 104. Accordingly, in some embodiments plug 152 may be configured to attach to and subsequently allow for regulation of one or more of light 130 and vent 140 via user interface 150. It is further contemplated that plug 152 may be coupled to other components within the vehicle to allow a user, via user interface 150, to regulate said components. For example, user interface 150 may be used to control shades, dimming of windows, audio, tv, seat adjustments, seat heating, seat cooling, seat massaging systems, signage, etc. In some embodiments, user interface 150 may include a switch, button, touch screen, dial, or other commonly known user input device is accessible from internal cabin 102. For example, at least a portion of user interface 150 may protrude through hole 114c in panel 110 (see FIGS. 2 and 5) and through a third hole 122c in bezel plate 120 (see FIG. 5). User interface 150 may be operatively coupled to a controller. For example, user interface 150 may be operatively coupled with a printed circuit board (PCB) having electronics (including e.g., a microcontroller) for providing control signals indicative of inputs received via user interface 150; alternatively, user interface 150 may be communicatively coupled with another device for providing control signals such as a computer onboard the vehicle or a mobile device (e.g., a phone, tablet, smart watch, laptop computer, etc.) via a wireless communication device.

The attachment between user interface 150 and the other components (e.g., light 130, vent 140, etc.) may occur within the external compartment 104 or within the fixture 100. Further, in some embodiments plug 152 may be configured to couple to one or more switches via the external compartment 104. Coupling between plug 152 and any additional switches may be wired or wireless. Accordingly, one or more of the light 130, vent 140, or other component, may be controlled externally without the use of user interface 150. For example, a crew member may be capable of controlling light 130 and/or vent 140 from a singular location within the vehicle. In another example, a pilot may be capable of controlling light 130 and/or vent 140 from the cockpit of an aircraft. In yet another example, a passenger may be able to control light 130 and/or vent 140 from a mobile device.

FIG. 3 illustrates a perspective view of the fixture 100 from the external compartment 104, in some embodiments. As illustrated, when fixture 100 is assembled, external portions 136/146 extend into the external compartment 104. Additionally, the fasteners 118a/118b are shown affixed to the holes 114a/114b in panel 110. As such, the fasteners 118a/118b receive most or all of external portions 136/146. The fasteners 118a/118b are configured to fasten or otherwise couple to a segment of the external portions 136/146, such as coupling features 138/148. For example, in some embodiments fasteners 118a/118b are internally threaded while coupling features 138/148 are externally threaded, thereby allowing the light 130 and/or vent 140 to threadably couple to the fastener 118a/118b. It is contemplated that other coupling or fastening mechanisms may be used to couple the light 130 and/or vent 140 to the fasteners 118a/118b or panel 110. For example, a slot and groove mechanism, a suction mechanism, magnetic mechanism, or others may be employed to couple the light 130 and/or vent 140 to the panel 110.

In some embodiments, light 130 may be electrically coupled to one or more components of the vehicle. For example, light 130 may include wires 131 to connect to a power source located within the vehicle. In another example, wires 131 may be connected to user interface 150 by way of plug 152 or other portion of user interface 150 located in the external compartment 104.

Figure 5:
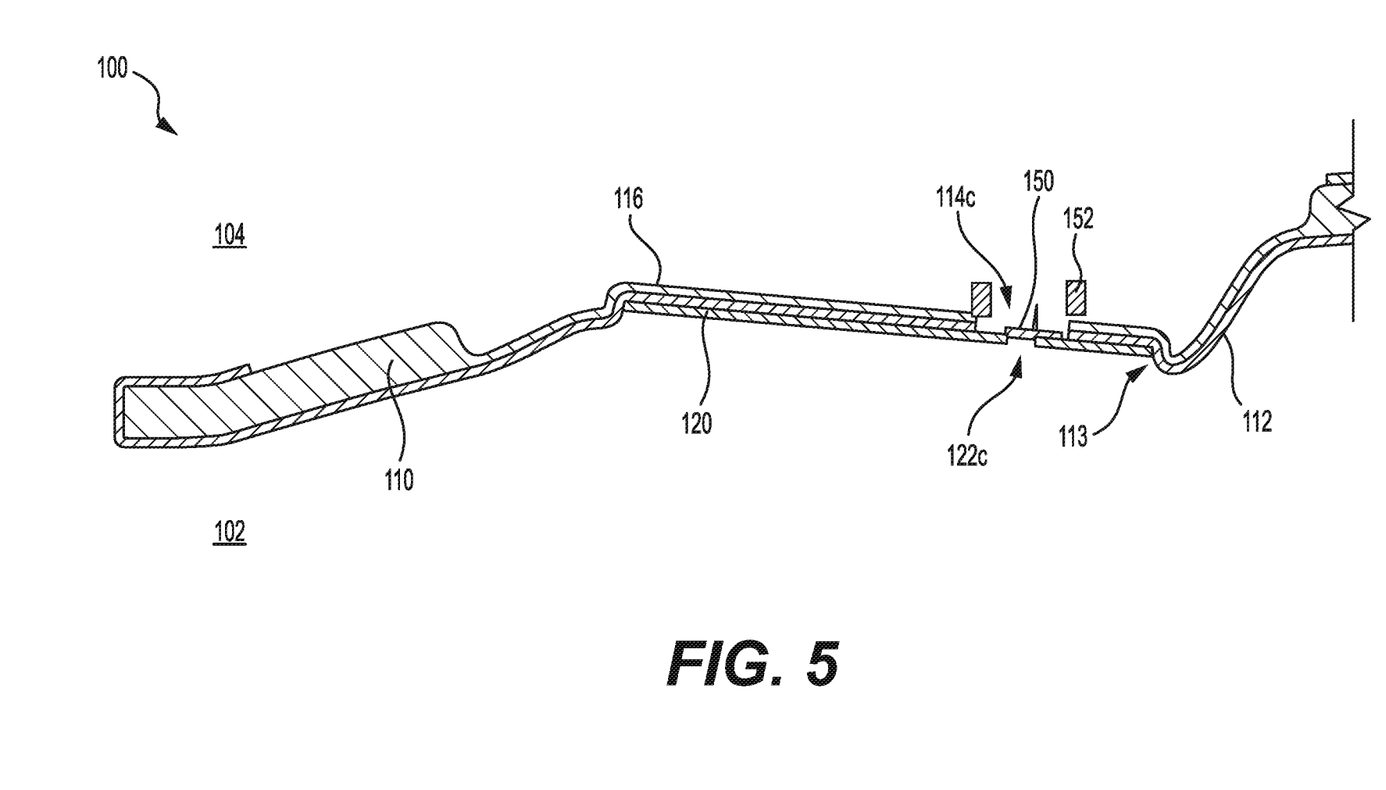
FIG. 5 is a cross sectional side view of the fixture of FIG. 1, in some embodiments.

FIG. 4 and FIG. 5 each provide a side cross-sectional view of fixture 100 shown at different cross-sections along a longitudinal axis as indicated in FIG. 1. As illustrated and described above, the housing 112, recess 113, and recessed flat surface 116 are configured to direct light 130 or vent 140 in a specific direction. For example, the recessed flat surface 116 may be substantially perpendicular to a passenger seat within the internal cabin 102.

As further illustrated, the external portion 136 of light 130 extends substantially into the external compartment 104 while the internal portion 134 is located within the internal cabin 102. In some embodiments internal portion 134/144 is configured to be adjusted by a passenger located within internal cabin 102. For example, internal portion 134/144 may be rotationally adjustable such that the direction of the light and/or air flow can be adjusted in a limited range. Further, in some embodiments the internal portion 134/144 may be configured to adjust the amount of light and/or the rate of air flow from the light 130 or vent 140, respectively. Similarly, in some embodiments the user interface 150 may be substantially flush with the bezel plate 120 such that user interface 150 extends only slightly into the internal cabin 102.

As described in detail above and illustrated here, the recess 113 may be about the depth of the bezel plate 120. Accordingly, the internal surface of the panel 110 and the bezel plate 120 may be substantially congruous when viewed from the internal cabin 102.

As further described above and illustrated here, the flange 132 may be configured to extend radially outward from light 130 such that it captures the bezel plate 120 when fixture 100 is assembled. In some embodiments, flange 132, recessed flat surface 116, and fastener 118a work in conjunction to secure the bezel plate 120 and light 130 to the panel 110. As best viewed in FIG. 4, bezel plate 120, housing 112, and panel 110 are all sandwiched between flange 132 and fastener 118a. Tightening of fastener 118a via coupling feature 138 secures light 130 (or vent 140); conversely, loosening of fastener 118a via coupling feature 138 enables facile removal or adjustment of light 130/140.

Figure 6:
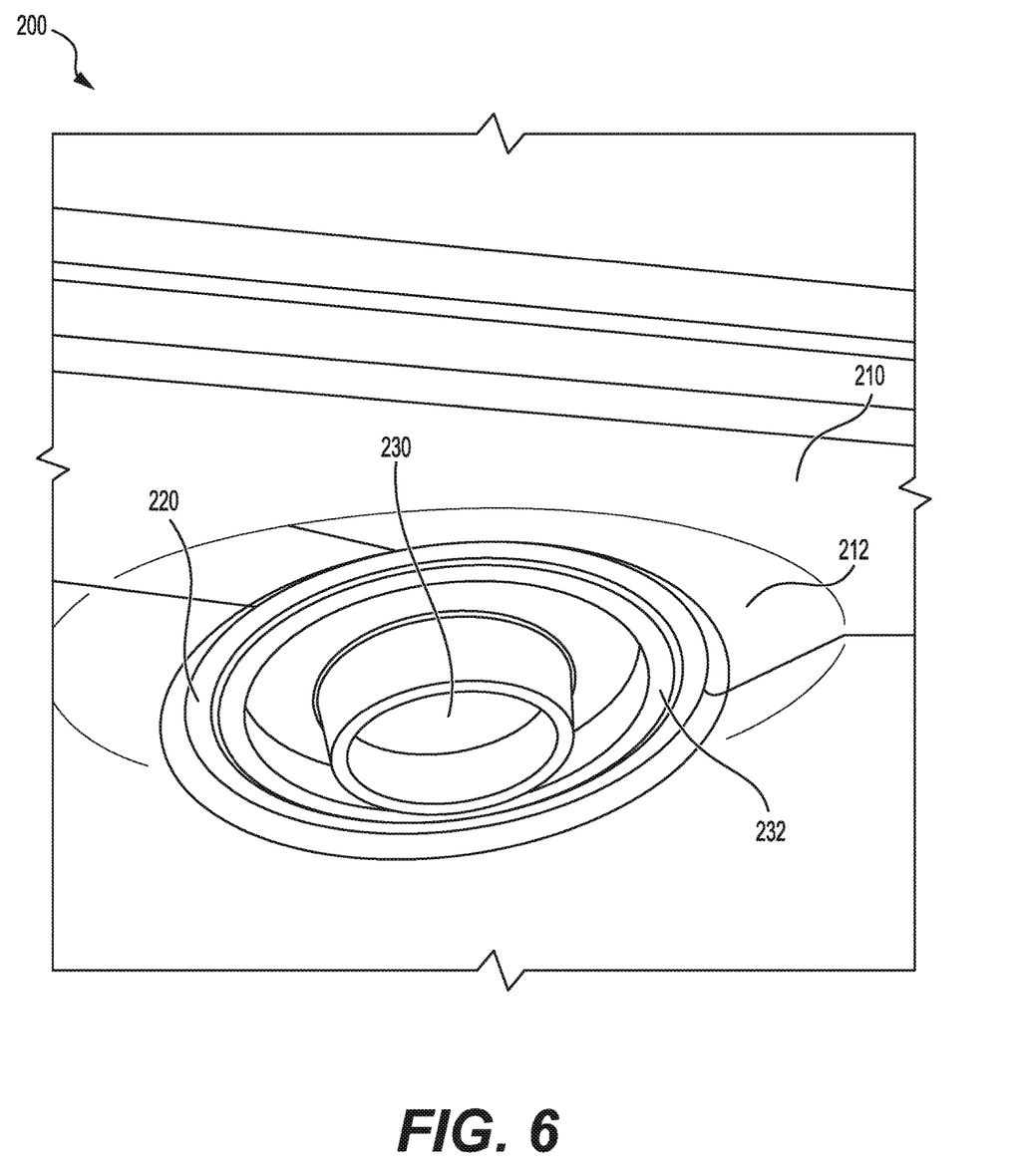
FIG. 6 is a perspective view of a fixture, in some embodiments.
Figure 7:
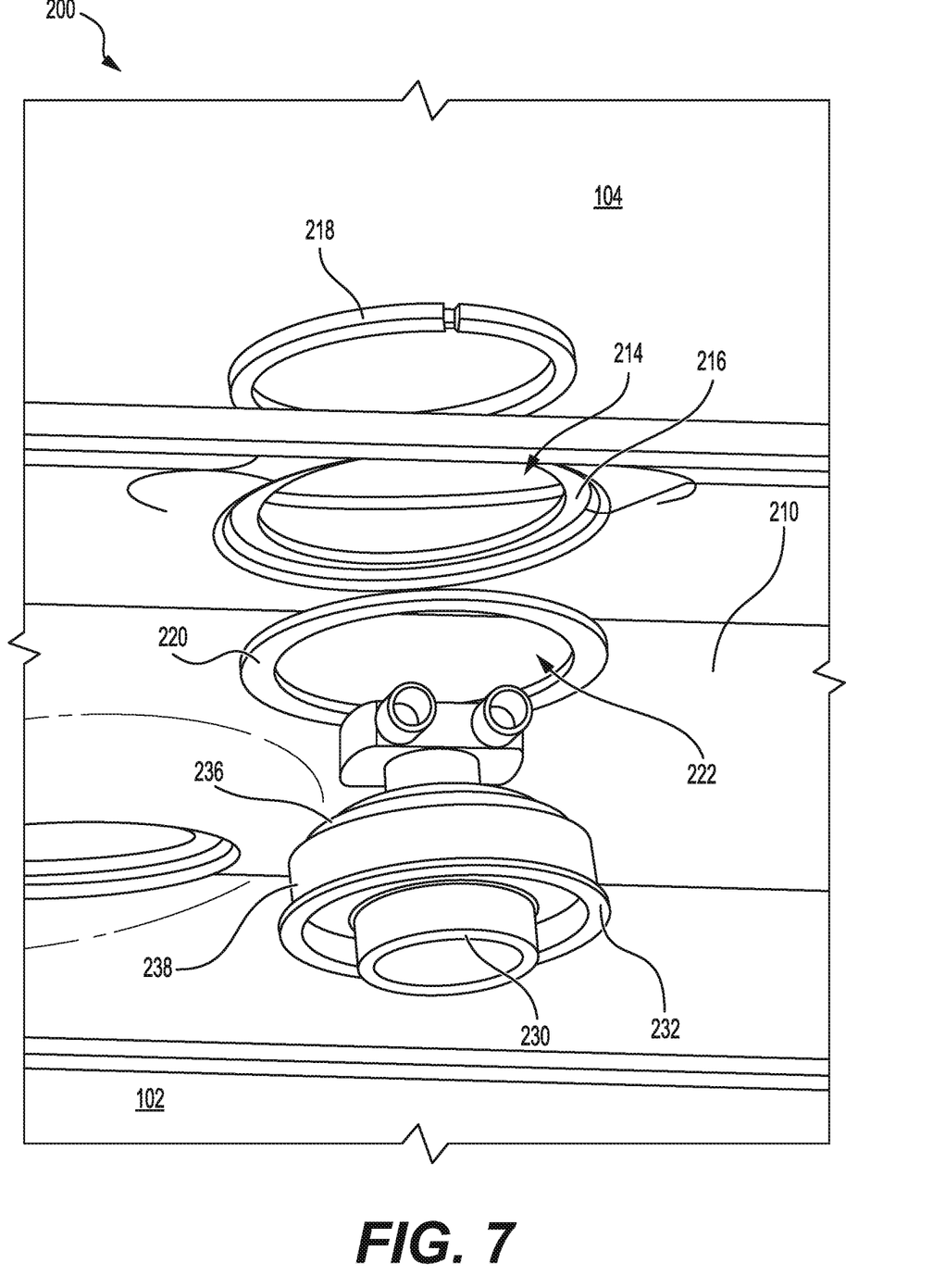
FIG. 7 is an exploded perspective view of the fixture of FIG. 6.
Figure 8:
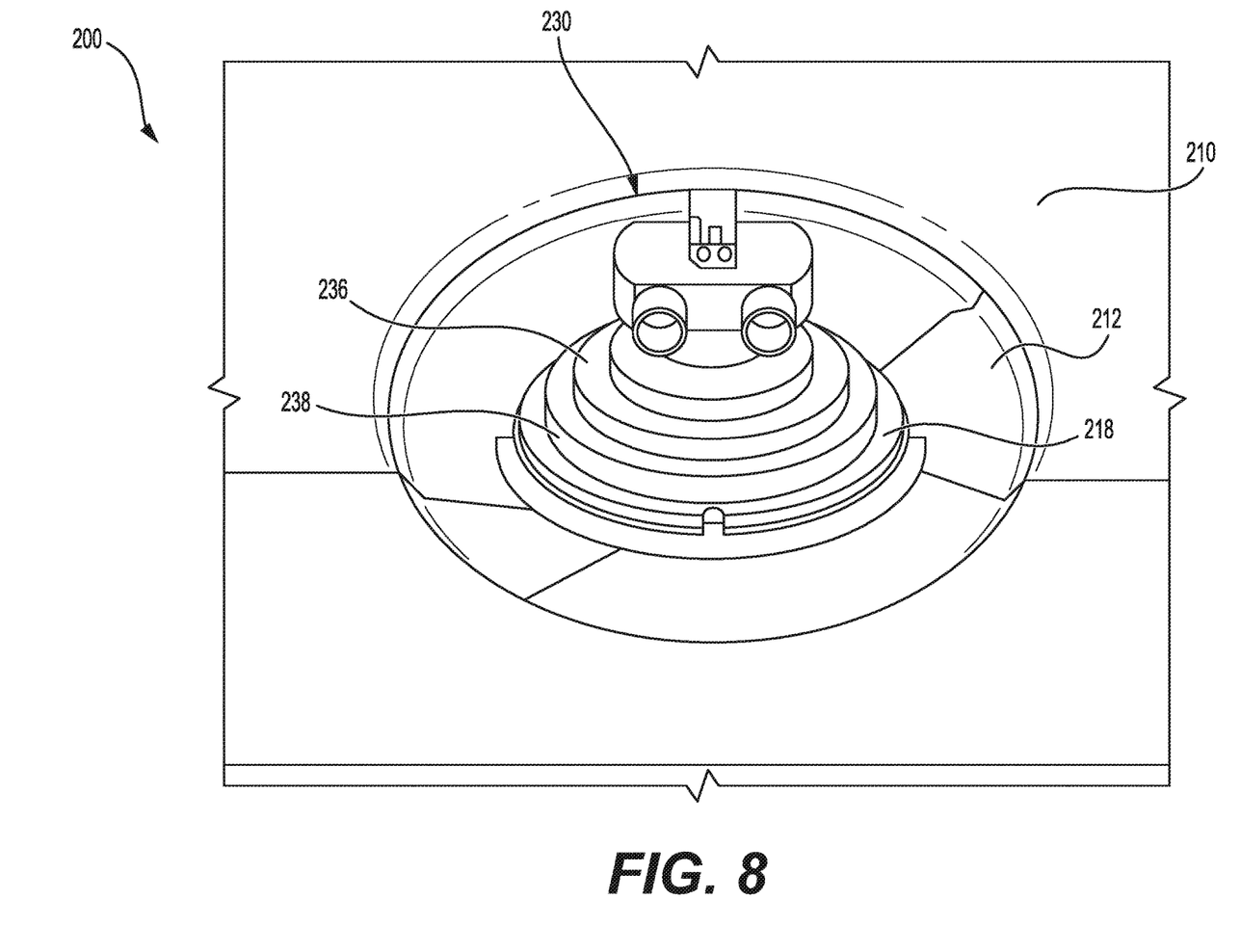
FIG. 8 is a perspective view of the fixture of FIG. 6 from the external compartment.

FIGS. 6-8 illustrate some embodiments of a fixture 200 that includes one component (e.g., light 230). FIG. 6 shows fixture 200 from internal cabin 102; FIG. 7 is an exploded view of fixture 200; and FIG. 8 shows fixture 200 from external compartment 104. Accordingly, FIGS. 6-8 are best viewed together with the following description. Fixture 200 is configured to house and secure one component (e.g., light 230 or a vent, such as vent 140 of FIG. 1) to a panel 210 of a vehicle. Similar to fixture 100, fixture 200 includes a flange 232 extending from the component (e.g., light 230) configured to secure a bezel plate 220 to the panel 210. In some embodiments, panel 210 may have a housing 212 configured to receive some or all of the component.

Similar to fixture 100, housing 212 may be an extension or recession in panel 210. A recess 216 is an example of recess 113 configured to receive bezel plate 220. In some embodiments, housing 212 and recess 216 may be configured to orient the light source from light 230 (or air flow from vent 240, not shown) in a predetermined direction. For example, panel 210 may be substantially rounded, such as a cabin of an aircraft. In this example, housing 212 and/or bezel plate 220 within recess 216 may act as a substantially flat surface to allow for the light source from light 230 to be secured for pointing in a the predetermined direction.

As discussed above with reference to fixture 100, fixture 200 may include a fastener 218. Fastener 218 may be placed on or affixed to the external surface of panel 210. In some embodiments, fastener 218 is configured to receive and couple to a portion of the component that is inserted through hole 214 in panel 210. For example, external portion 236 of light 230 may be inserted into and through hole 222 in bezel plate 220, hole 214 in panel 210, and fastener 218. A coupling feature 238 may then fasten, couple, or otherwise attach to fastener 218. In some embodiments, coupling feature 238 may be externally threaded while fastener 218 may be internally threaded. In these embodiments, coupling feature 238 may be threadably received by fastener 218. As mentioned above, in some embodiments fixture 200 may not need fastener 218 to couple the component to the panel 210. For example, the internal portion of hole 214 may be configured to attach, couple, or otherwise affix to coupling feature 238.

As illustrated in FIGS. 6 and 8, when fixture 200 is assembled, bezel plate 220 is maintained and secured against panel 210. For example, bezel plate 220 is sandwiched between flange 232 and recess 216. As discussed above with reference to fixture 100, bezel plate 220 may be configured to be substantially congruous with the internal surface of panel 210. Accordingly, an observer within internal cabin 102 may only see a slight perturbance in the internal surface of panel 210 where the component is affixed.

While fixture 200 illustrates one component being affixed to panel 210, and fixture 100 illustrates two components being affixed to panel 210, in some embodiments the fixture may be configured to affix three, four, five, six, seven, eight, or more components to the panel of a vehicle. For example, by increasing the number of holes in panel 110 and the corresponding number of holes in bezel plate 120, any number of components may be attached to panel 110 such that the bezel plate is still congruous with the internal surface of the panel 110 and secured to panel 110 by the described components.

Figure 9:
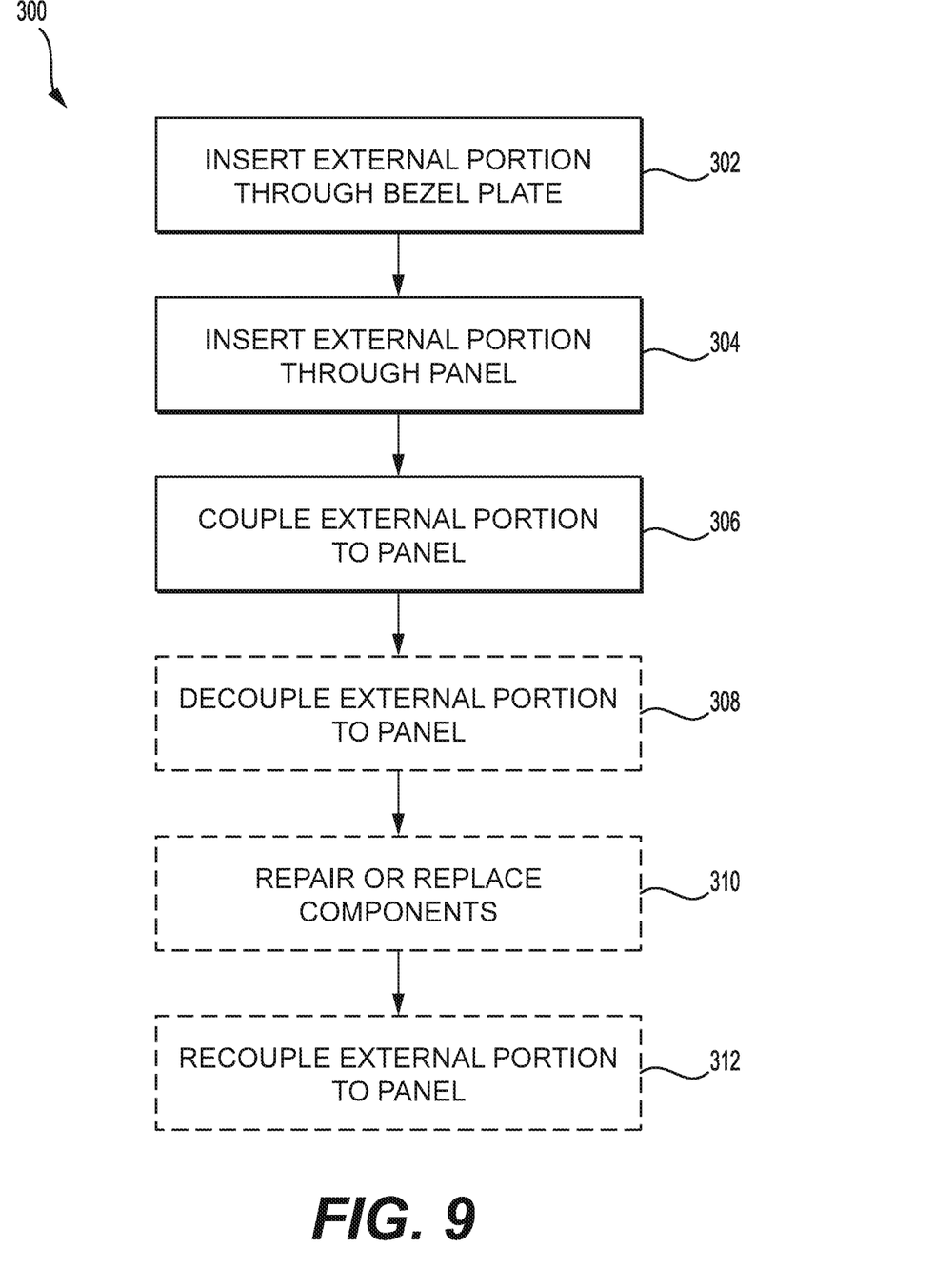
FIG. 9 is a process flow diagram illustrating an assembly method of the fixture of FIGS. 1 and 6, in some embodiments.

Turning now to FIG. 9, a flow process diagram illustrating an assembly method 300 for fixture 100/200 is depicted. In the following description, for clarity, method 300 is discussed with reference to fixture 100. However, it is to be understood that method 300 may similarly be applied to fixture 200.

In a step 302, an external portion of a light or vent is inserted through a hole in a bezel plate. In an example of step 302, the external portion 136 of light 130 is inserted through hole 122a located in bezel plate 120. In another example of step 302, the external portion 146 of vent 140 is inserted through hole 122b located in bezel plate 120. In some instances, both of the above examples may be performed at the same time. Alternatively, one, two, three, four, or more lights 130 or vents 140 may be inserted through holes located on a bezel plate for a fixture. In yet further examples, in addition to the external portion 136/146 being inserted through hole 122a/112b, wiring or other connective components may also be inserted through hole 122a/122b that will be directed into the external compartment 104.

In a step 304, the external portion is inserted through a hole located within a panel. In an example of step 304, the external portion 136 is inserted through hole 114a located within panel 110. In another example of step 304, the external portion 146 is inserted through hole 114b located within panel 110. The aforementioned examples may be performed simultaneously in embodiments in which bezel plate 120 and panel 110 have two holes.

In a step 306, the external portion is coupled to a fastener. In an example of step 306, coupling feature 138 located on external portion 136 is coupled to fastener 118a. In another example of step 306, coupling feature 148 located on external portion 146 is coupled to fastener 118b. In some instances, coupling feature 138/148 may be threadably coupled to fastener 118a/118b. For example, coupling feature 138/148 has exterior threads configured to cooperate with interior threads of fastener 118a for threading together. Importantly, coupling of light 130, vent 140, and/or user interface 150 to panel 110 provides support to keep bezel plate 120 in place. In other words, bezel plate 120 is sandwiched between flange 142/232 and fastener 118a/218 for securing the component (e.g., light 130/230 or vent 140/240) to panel 110/210.

In an optional step 308, the external portion is decoupled from the panel (e.g., for repairing or replacing components of the fixture, light, vent, and/or control panel). In an example of step 308, coupling feature 138 located on external portion 136 is decoupled from fastener 118a. In another example of step 308, coupling feature 148 located on external portion 146 is decoupled from fastener 118b. In instances where coupling feature 138/148 is threadably coupled to fastener 118a/118b (i.e., rotated in a first direction), then the coupling feature 138/148 may be oppositely rotated (i.e., rotated in a second direction opposite the first direction) to decouple the light 130 and/or vent 140 from the panel 110. In examples where two or more components are coupled to panel 110, then the other components may be left coupled to the panel 110 such that bezel plate 120 will be kept in place while the individual component is decoupled. Alternatively, the two or more components may be simultaneously decoupled from the panel 110 such that bezel plate 120 is removable from panel 110.

In an optional step 310, components of the fixture, light, vent, and/or control panel are repaired or replaced. In an example of step 310, the light source of light 130 may lose luminescence and may therefore be replaced with a new, functional light source.

In an optional step 312, the external portion is recoupled to the panel. In an example of step 312, the coupling feature 138 located on external portion 136 is recoupled to fastener 118a. In another example of step 306, coupling feature 148 located on external portion 146 is recoupled to fastener 118b. In some instances, coupling feature 138/148 may be threadably coupled to fastener 118a/118b. Importantly, coupling of light 130, vent 140, and/or user interface 150 to panel 110 provides support to keep bezel plate 120 in place.

Assembly method 300 allows for the light 130, vent 140, and/or user interface 150 to maintain the position of the bezel plate 120 against the panel 110. Such an assembly allows for ease of maintenance of components of fixture 100/200 (e.g., light 130, vent 140, user interface 150, etc.). Additionally, the assembly method 300 and fixture 100/200 provide an aesthetic feature for securing one or more components (e.g., light 130, vent 140, user interface 150, etc.) within a panel (e.g., panel 110) of a vehicle.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A fixture configured to secure a component in a vehicle, the fixture comprising:
    a panel separating an internal cabin from an external compartment, wherein the panel has a first side facing the internal cabin and a second side facing the external compartment;
    a hole disposed within the panel;
    the component is configured for mounting to the panel via the hole, wherein the component comprises:
        a flange configured for abutting the first side of the panel; and
        a coupling feature configured to extend through the hole into the external compartment;
    a fastener configured to removably couple with the coupling feature and abut the second side of the panel for fastening the component to the panel; and
    a bezel plate disposed between the flange and the first side of the panel;
    wherein the bezel plate comprises a flat surface and a hole through the flat surface, wherein the hole of the bezel plate is configured to align with the hole of the panel, and wherein the panel comprises a recess and the bezel plate is configured to insert into the recess.

2. The fixture of claim 1, wherein the bezel plate abuts against the flange and is secured between the flange and the panel in the recess when the component is fastened to the panel via the fastener.

3. The fixture of claim 1, wherein the component comprises a light.

4. The fixture of claim 1, wherein the component comprises a vent.

5. The fixture of claim 1, wherein the fastener comprises interior threads and the coupling feature comprises exterior threads such that the fastener threadably couples to the coupling feature for fastening the component to the panel.

6. A fixture configured to secure at least two components in a vehicle, the fixture comprising:
    a panel dividing an internal cabin from an external compartment, wherein the panel has a first side facing the internal cabin and a second side facing the external compartment;
    a first hole disposed within the panel, and a second hole disposed within the panel adjacent the first hole;
    a first component configured for mounting to the panel through the first hole;
    a second component configured for mounting to the panel through the second hole,
    wherein the first component and the second component each comprise:
        a flange configured for remaining on the first side of the panel; and
        a coupling feature configured to extend into the external compartment;
    a first fastener configured to removably couple to the coupling feature of the first component and abut the second side of the panel for fastening the first component to the panel;
    a second fastener configured to removably couple to coupling feature of the second component and abut the second side of the panel for fastening the second component to the panel; and
    a bezel plate having a matching first hole configured to align with the first hole in the panel, and a matching second hole configured to align with the second hole in the panel;
    wherein the first component inserts through the matching first hole until its flange abuts the bezel plate and the second component inserts through the matching second hole until its flange abuts the bezel plate, and wherein the panel comprises a recess and the bezel plate is configured to insert into the recess.

7. The fixture of claim 6, wherein the first component comprises a light and the second component comprises a vent.

8. The fixture of claim 6, comprising a user interface, wherein a portion of the user interface is accessible through a third hole in the panel and a matching third hole in the bezel plate to be accessible from within the internal cabin.

9. The fixture of claim 8, wherein the user interface comprises a plug extending into the external compartment, and the plug operatively couples the user interface to a controller configured to receive input signals from the user interface.

10. The fixture of claim 6, wherein each fastener comprises interior threads and each coupling feature comprises exterior threads such that each fastener threadably couples to a respective coupling feature for fastening the first and second components to the panel.

11. An assembly method for a fixture configured to secure a component in a vehicle, the assembly method comprising:
    inserting an external portion of the component through a hole in a bezel plate, wherein the component comprises a flange configured to abut against the bezel plate around the hole;
    inserting the external portion of the component through a matching hole in a panel such that the matching hole is in alignment with the hole in the bezel plate, wherein the panel separates an internal cabin from an external compartment; and
    coupling the component to a fastener in the external compartment such that the bezel plate is inserted into a recess of the panel, the bezel plate and the panel are sandwiched between the flange and the fastener for securing the component to the panel.

12. The assembly method of claim 11, wherein coupling the component to the fastener comprises threading interior threads of the fastener onto exterior threads of the component.

13. The assembly method of claim 11, comprising decoupling the component from the fastener and retrieving the component from the panel and the bezel plate thereby enabling repair or replacement of the component.

14. The assembly method of claim 13, comprising repairing or replacing the component to provide an upgraded component.

15. The assembly method of claim 14, comprising recoupling the upgraded component to the panel, comprising:
   inserting an external portion of the component through the hole and the matching hole; and
   coupling the component to the fastener for securing the component to the panel.

* * * * *